(No Model.)
C. W. MOORE.
BARREL CLOSURE.
No. 463,253.  Patented Nov. 17, 1891.
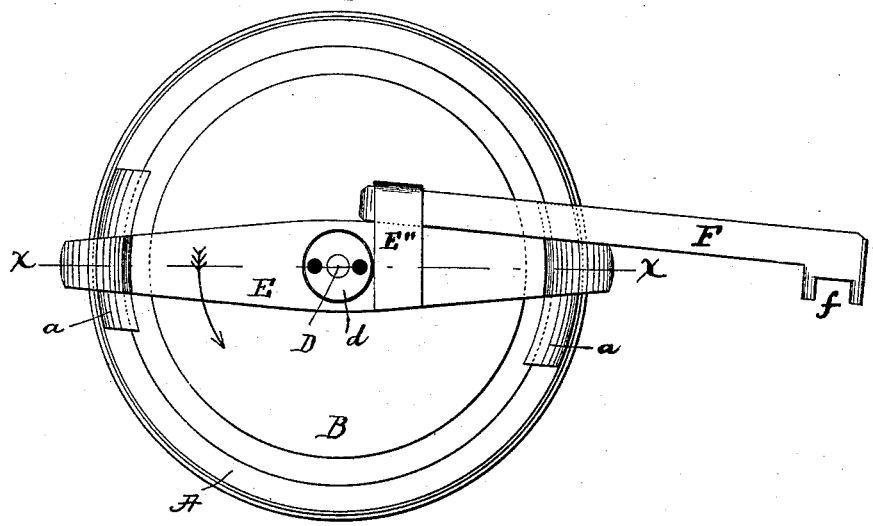
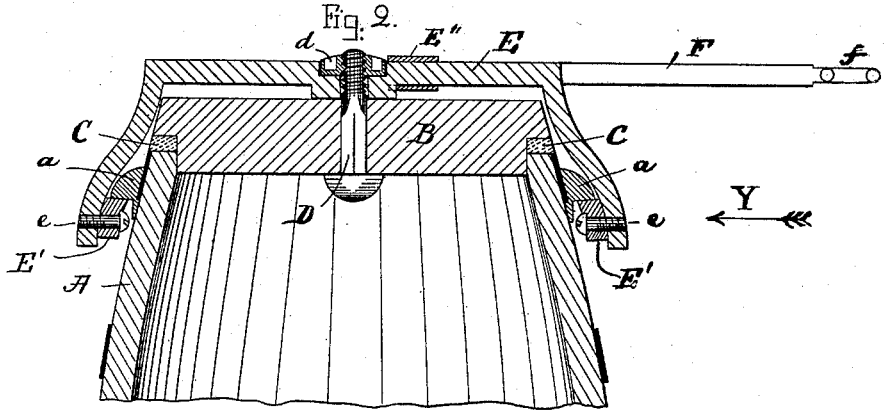
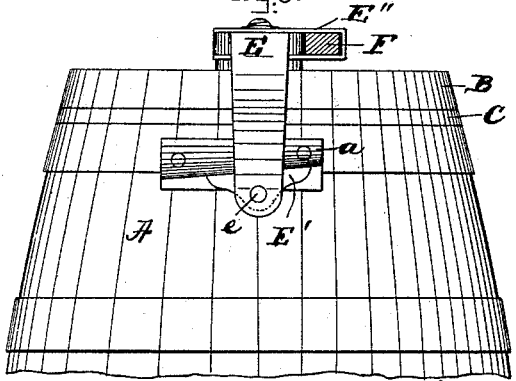
Witnesses.  Inventor.
Lauritz N. Möller  Clarence W. Moore
Alice A. Perkins  by Alban Andrén, his atty.

UNITED STATES PATENT OFFICE.

CLARENCE W. MOORE, OF PEABODY, MASSACHUSETTS.

BARREL-CLOSURE.

SPECIFICATION forming part of Letters Patent No. 463,253, dated November 17, 1891.

Application filed July 27, 1891. Serial No. 400,845. (No model.)

*To all whom it may concern:*

Be it known that I, CLARENCE W. MOORE, a citizen of the United States, and a resident of Peabody, in the county of Essex and State of Massachusetts, have invented new and useful Improvements in Barrel-Closures, of which the following, taken in connection with the accompanying drawings, is a specification.

This invention relates to improvements in barrel or box closure for the purpose of making an air-tight connection between the cover and the box or barrel, and my present invention is an improvement on the device for which an application filed by me June, 1891, Serial No. 395,357, is now pending in the United States Patent Office.

My present invention is carried out as follows, reference being had to the accompanying drawings, in which—

Figure 1 represents a top plan view of the box or barrel, showing the lever in position on the cover for attaching and detaching the latter relative to the box or barrel. Fig. 2 represents a longitudinal section of the upper end of the box or barrel on the line X X shown in Fig. 1; and Fig. 3 represents a side elevation as seen from Y in Fig. 2.

Similar letters refer to similar parts wherever they occur on the different parts of the drawings.

A represents the upper end of a cylindrical box or barrel, to the outer periphery of which are secured two or more helical or inclined ribs or projections $a$ $a$, like those shown in my application aforesaid.

B is the cover, having interposed between its under side and the upper edge of the box or barrel a rubber or other elastic packing-ring C, as shown in Figs. 2 and 3.

To the central portion of the cover B is secured the screw-bolt D, on the upper portion of which is pivoted the clamping bar or bail E, having pivoted to its lower ends at $e$ $e$ the rockers or bearing-blocks E' E', adapted to fit against the inclines $a$ $a$ when the cover is closed on the box or barrel, as shown in the drawings. The upper end of the bolt D is screw-threaded and provided with a nut $d$, which when tightened serves for the purpose of securing the bail and cover together, and thus preventing the accidental unlocking of the bail and its bearing-blocks from the inclines on the box or barrel during transportation or otherwise, as the case may be.

For the purpose of turning the bail E on its pivot in attaching or detaching the cover, I prefer to use a detachable lever F, adapted to be inserted in a socket E″ on the bail E, as shown in the drawings. The outer end of the lever F constitutes a key $f$, for the purpose of turning the nut $d$, and said key may be made of any well-known form, according to the shape or construction of the nut that is used.

By having the bail E pivoted to the cover B, as shown and described, said bail and its pivoted bearing-blocks can be actuated with greater ease and facility in opening or closing the box or barrel as compared with devices in which the said bail is firmly attached to said cover.

If the cover is in a closed position on the barrel or box, as shown in the drawings, and it is desired to open the barrel or box, I loosen the nut $d$ and turn the bail E in the direction of the arrow (shown in Fig. 1) until the blocks E' E' pass by the inclines $a$ $a$, after which the cover can be raised and detached from the upper end of the barrel.

In closing the box or barrel, the cover is placed in position as shown in Fig. 2, and the bail is turned by means of the lever F' until the blocks E' E' are brought firmly in contact with the under side of the inclines $a$ $a$ on the barrel or box, causing the cover to be forced and held air-tight against the end of the barrel or box and the elastic packing-ring interposed between said parts, as shown in the drawings. The nut $d$ is then tightened, so as to prevent the accidental unlocking of the cover, as hereinabove set forth.

Having thus fully described the nature, construction, and operation of my invention, I wish to secure by Letters Patent and claim—

1. In a barrel or box closing device, a removable cover and a bail pivoted to it, combined with pivoted pressure-blocks on said bail, stationary inclines on the barrel, and a locking-nut on the bail pivot-bolt, substantially as and for the purpose set forth.

2. In a barrel or box closing device, a removable cover and a bail pivoted to it and having a socket for receiving a detachable lever, combined with pressure-blocks pivoted to said bail, stationary inclines on the barrel, and a locking-nut on the bail pivot-bolt, substantially as and for the purpose set forth.

In testimony whereof I have signed my name to this specification, in the presence of two subscribing witnesses, on this 25th day of July, A. D. 1891.

CLARENCE W. MOORE.

Witnesses:
 ALBAN ANDRÉN,
 CHARLES W. ENOS.